United States Patent
Link

(10) Patent No.: US 7,758,007 B2
(45) Date of Patent: Jul. 20, 2010

(54) SUPPORT FOR A ROTATABLE COMMERCIAL VEHICLE SEATING AND OPERATING UNIT

(75) Inventor: Alfred Link, Butzbach (DE)

(73) Assignee: Dipl.-Ing. agr. Andreas Reichhardt, Hungen (DE)

( * ) Notice: Subject to any disclaimer, the term of this patent is extended or adjusted under 35 U.S.C. 154(b) by 302 days.

(21) Appl. No.: 11/064,735

(22) Filed: Feb. 24, 2005

(65) Prior Publication Data

US 2005/0189464 A1   Sep. 1, 2005

(30) Foreign Application Priority Data

Feb. 27, 2004   (DE)   ................... 20 2004 003 047 U

(51) Int. Cl.
*F16M 13/00*   (2006.01)

(52) U.S. Cl. .................. 248/417; 248/425; 248/131; 248/415; 248/416; 248/631; 297/344.21; 297/344.12; 297/338; 297/344.26; 297/344.19; 297/313

(58) Field of Classification Search .......... 248/425, 248/131, 415, 416; 297/344.21, 344.12, 297/338, 344.26

See application file for complete search history.

(56) References Cited

U.S. PATENT DOCUMENTS

| 2,067,668 | A | * | 1/1937 | Knight et al. ................ 248/425 |
|---|---|---|---|---|
| 2,653,648 | A | * | 9/1953 | Marshall ................ 297/344.19 |
| 3,253,856 | A | * | 5/1966 | Ueda .......................... 296/68 |
| 3,709,555 | A | * | 1/1973 | Ostertag ..................... 297/142 |
| 3,964,713 | A | * | 6/1976 | Joslyn et al. ................ 248/418 |
| 4,097,016 | A | * | 6/1978 | Petrucci ..................... 248/418 |
| 4,143,436 | A | * | 3/1979 | Jones ......................... 114/363 |
| 4,241,893 | A | * | 12/1980 | Koutsky et al. ............. 248/425 |
| 4,267,999 | A | * | 5/1981 | Chekirda et al. ............ 248/418 |
| 4,487,452 | A | * | 12/1984 | Tanizaki et al. ........ 297/344.22 |
| 4,518,139 | A | * | 5/1985 | Barfell ....................... 248/418 |
| 4,588,226 | A | * | 5/1986 | Young et al. ........... 297/344.24 |
| 5,522,641 | A | * | 6/1996 | Infanti .................... 297/344.13 |
| 5,678,886 | A | * | 10/1997 | Infanti ..................... 297/217.3 |
| 5,702,084 | A | * | 12/1997 | Carnahan et al. ........... 248/416 |
| 5,720,462 | A | * | 2/1998 | Brodersen .................. 248/425 |
| 5,722,617 | A | * | 3/1998 | Cecinas ................. 244/122 R |

(Continued)

FOREIGN PATENT DOCUMENTS

DE   25 07 168   9/1976

(Continued)

*Primary Examiner*—J. Allen Shriver, II
*Assistant Examiner*—Michael McDuffie
(74) *Attorney, Agent, or Firm*—Collard & Roe, P.C.

(57) ABSTRACT

A commercial vehicle seating and operating unit fastened to a support (1) comprises a rotatably supported base plate (2), by means of which the seating and operating unit is supported rotatably about a vertical axis of rotation.

The bearing arrangement comprises two cylindrical sleeves, which are disposed one coaxially in the other, a first inner sleeve (19) that is rigidly connected to the commercial vehicle and a second outer sleeve (21) that is rigidly connected to the seating and operating unit, the inner sleeve (19) forming a passage for the penetration of cables, pipes or hosepipes that connect the seating and operating unit to a unit of the vehicle.

The bearing arrangement has a limiting device, which limits the rotation of the seating and operating unit about the vertical axis to a preset maximum angle.

14 Claims, 4 Drawing Sheets

U.S. PATENT DOCUMENTS

| | | | | |
|---|---|---|---|---|
| 5,733,006 A * | 3/1998 | Woods | ................... | 297/344.22 |
| 5,904,399 A * | 5/1999 | Kim et al. | .............. | 297/344.21 |
| 5,941,498 A * | 8/1999 | Hoshihara et al. | ........... | 248/550 |
| 5,954,551 A * | 9/1999 | King | ............................ | 440/6 |
| 6,012,775 A * | 1/2000 | Czarnecki | .............. | 297/344.13 |
| 6,402,114 B1 * | 6/2002 | Carnahan et al. | ............. | 248/425 |
| 6,536,842 B2 * | 3/2003 | Bowers et al. | ......... | 297/344.22 |
| 6,572,172 B1 * | 6/2003 | Ninomiya et al. | ........ | 296/65.12 |
| 6,575,420 B2 * | 6/2003 | Yoshida et al. | .............. | 248/425 |
| 6,666,514 B2 * | 12/2003 | Muraishi et al. | ....... | 297/344.22 |
| 6,688,665 B2 * | 2/2004 | Michel | .................... | 296/65.07 |
| 2001/0032916 A1 * | 10/2001 | Wess et al. | ............... | 248/349.1 |

FOREIGN PATENT DOCUMENTS

| | | |
|---|---|---|
| DE | 25 07 268 | 9/1976 |
| DE | 92 04 392.5 | 7/1992 |
| DE | 199 61 249 | 7/2000 |
| EP | 0369 951 | 5/1990 |
| EP | 1 260 477 | 11/2002 |

* cited by examiner

SUPPORT FOR A ROTATABLE COMMERCIAL VEHICLE SEATING AND OPERATING UNIT

BACKGROUND OF THE INVENTION

The invention relates to a support for a commercial vehicle seating and operating unit, which is fastened to the support and comprises a rotatable bearing arrangement, thereby enabling rotation of the seating and operating unit about a vertical axis of rotation, the axis of rotation being spaced apart from the center of the seating and operating unit.

Commercial vehicles such as agricultural and industrial tractors, fork lift trucks and the like often have a plurality of seat positions, from which the vehicle may be controlled. This is necessary because the commercial vehicle performs different tasks, e.g. mowing, ploughing, digging or travelling, for which the person sitting in the seating and operating unit needs to adopt different positions to allow close monitoring of events. In particular, agricultural tractors often have to be driven in a forward or backward position of the seating or operating unit. Nowadays, seating units in commercial vehicles are often multi-functionally equipped in such a way that the driver sitting in the seat may guide the commercial vehicle by means of operating units disposed on the seat, in particular on the armrest of the seat. This means that the lines needed to connect the operating units to the commercial vehicle, such as electric cables, hydraulic or compressed-air lines, have to be run from the commercial vehicle to the appropriate points on the seating unit without hindering the rotatability of the seating unit and without the durability of the lines being impaired by rotation of the seat.

From document EP 0 369 951 B1 a seat for a commercial vehicle is known, which is rotatable between two opposite positions, the seat in one of these positions being disposed higher above the floor of the cab than in the other position. An operating unit for controlling the commercial vehicle is not provided on the seat.

In document DE 25 07 168 C2 a rotatable seating and operating unit of a commercial vehicle is described, which in various positions is locked against rotation by means of two locking units, a first locking unit being operated manually and the second locking unit being releasable only when the parking brake is engaged and at least one further condition ruling out driving of the vehicle is met. Details regarding the construction and installation of lines, which lead from the vehicle to the seating and operating unit, are not inferable from this document.

DE 199 61 249 A1 also describes a rotatably supported seat, an eccentric mechanism or crank mechanism being disposed between the driver's seat and the chassis and/or the cab floor of the commercial vehicle. By means of the mechanism solution disclosed in this document, the achievement of a radial swinging of the seat on a rotation of the seat relative to the steering wheel of more than 90°, e.g. of up to 360°, is possible and provided.

From EP 1 260 477 A1, moreover, an arrangement for rotatably supporting the driver's seat of a commercial vehicle is known, in which the bottom frame of the seat is rotatably supported by means of a downwardly directed rotatable journal in the bore of a bearing element that is raised off the cab floor. Fastened to the bearing element is a plate having a plurality of peripheral recesses, into which a locking bar disposed on the frame of the seat latches in various angular positions of the seat. The maximum rotatability of the seat is limited to a swivelling angle of approximately 90° by means of adjustable stops on the bottom frame of the seat, the adjustable stops interacting with stop faces on the plate. Situated on the armrest of the seat are control levers. How these are connected to the associated drives in the vehicle is however not apparent.

SUMMARY OF THE INVENTION

It is an object of this invention is to provide a support for a commercial vehicle seating and operating unit, which is fastened to the support, the support providing the connection between the cab floor and the seating and operating unit and enabling rotation of the seating and operating unit into various seat positions.

Another object of the invention is to provide a support which is usable for various modern seating and operating units.

Another object of the invention is to provide a support for a commercial vehicle seating and operating unit suitable for the installation of electric power supply or signal cables, and pneumatic or hydraulic pipes required for the seating and operating unit, wherein the cables or pipes are securely supported without any risk of their being damaged by rotation of the seating and operating unit.

Still another object of the invention is to provide a support for a commercial vehicle seating and operating unit which is of a simple design and the manufacture of which entails a low material and cost outlay.

According to the present invention a support for a commercial vehicle seating and operating unit, which is fastened to the support comprises a rotatable bearing arrangement, by means of which the seating and operating unit is supported rotatably about a vertical axis of rotation, the bearing arrangement comprising two cylindrical sleeves disposed one coaxially in the other, a first sleeve that is rigidly connected to the commercial vehicle and a second sleeve that is rigidly connected to the seating and operating unit, the inner sleeve forming a passage for the penetration of cables, pipes or hosepipes that connect the seating and operating unit to a unit of the vehicle, and the bearing arrangement comprising a limiting device, which limits the rotation of the seating and operating unit about the vertical axis to a preset maximum angle.

The support according to the invention allows the necessary lines and/or cables to extend in a protected manner in the interior of the bearing arrangement. It allows rotation of the seating and operating unit only through a preset maximum angle so that electric cables and lines for the transfer of hydraulic or pneumatic pressure are not loaded excessively or damaged by the rotation. The support is of a simple design and its manufacture entails a low costs and material outlay. It is moreover guaranteed that the seating and operating unit is rotatable for climbing in and out. The seat surface may be disposed eccentrically relative to the axis of rotation so that, as it rotates, it is displaced to the side to create more legroom. Any desired seating and operating units may be fastened to the support according to the invention.

It may be provided that the limiting device is of an adjustable design so that the angle of rotation of the seating and operating unit that is available for rotation may be adapted to the requirements for working with the commercial vehicle. The locking of the support into any desired angle of rotation within the limited range is advantageous for adapting the position of the seating and operating unit to the requirements of the driver and of the actual tasks.

For the safety of driver and commercial vehicle, it is advantageous when the locking unit preventing rotation is releasable from the locking position only if at least one condition ruling out driving of the commercial vehicle is met. On the other hand, for the driver and commercial vehicle it is likewise a safety requirement that the commercial vehicle may not be driven from a position of rest when the locking unit is released and the seating and operating unit is not situated in the correct position. A condition ruling out driving of the vehicle is actuation of the parking brake. For the driver it is advantageous in this connection if, in the event of starting of the drive of the commercial vehicle in the absence of a condition ruling out driving of the vehicle or in the released state of the locking unit, a warning signal is audible, visible or tangible.

For fastening the seating and operating unit to the support a base plate that is horizontally displaceable is advantageous, so that the distance between the center of the seating and operating unit and the axis of rotation may be adapted to the requirements in the respective commercial vehicle.

The above and other features, objects and advantages of the present invention will become apparent from the following description of preferred embodiments taken in conjunction with the accompanying drawings. In the drawings.

DESCRIPTION OF THE PREFERRED EMBODIMENTS

Figure 1:
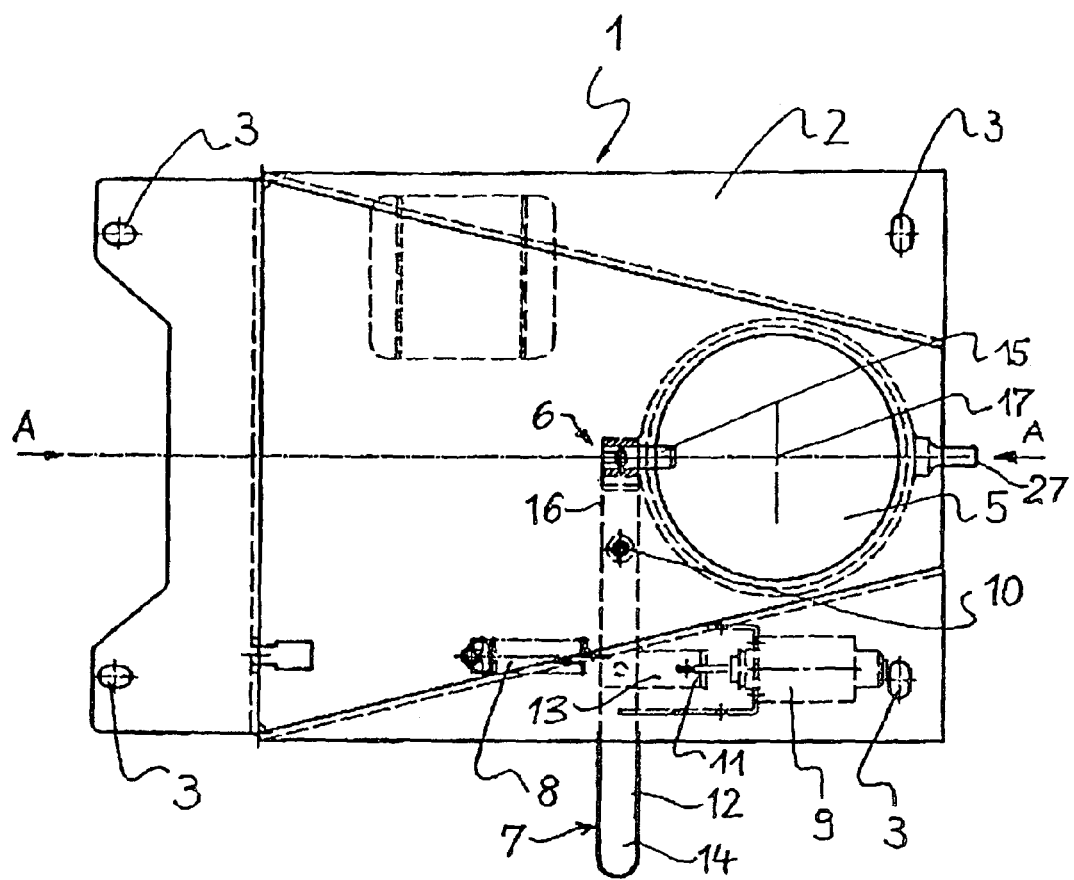
FIG. 1 is a plan view of a support according to the invention.

The support 1 illustrated in plan view in FIG. 1 comprises a base plate 2, on which the non-illustrated seating and operating unit is fastened, e.g. by means of screws, in through-openings 3. The base plate 2 has a further, circular through-opening 5, through which are run electric cables for the power supply or signal transmission and/or hydraulic or compressed-air lines of a seating and operating unit, which is fastened on the base plate 2. A two-armed lever 7 of a locking unit 6 is disposed below the base plate 2 and supported rotatably in a bearing fastened to the base plate 2.

One lever arm 12 of the lever 7 projects beyond the lateral edge of the base plate 2 and there, with its free end, forms a handle 14. Fastened to the free end of the other lever arm 16 of the lever 7 is a pin 15, which in the illustrated locking position of the lever 7 engages into openings. By means of a preloaded compression spring 8, which acts on the lever arm 12, the lever 7 is held in the locking position.

In the locking position of the lever 7, the base plate 2 and the seating and operating unit fastened thereto are locked and cannot be rotated. When the lever 7 is swivelled at the handle 14 in the drawing in a counterclockwise direction into a position, in which the pin 15 no longer engages into the openings, which are described in detail below with reference to FIG. 2, the base plate 2 with the seating and operating unit fastened thereon may be rotated. The axis of rotation, here, is the axis extending perpendicularly through the center 17 of the opening 5. Both positions of the lever 7 are detected by a switch 9, the contact pin 11 of which is connected by a bent lever 13 to the lever 7. The switch 9 is held on the underside of the base plate 2.

Figure 2:
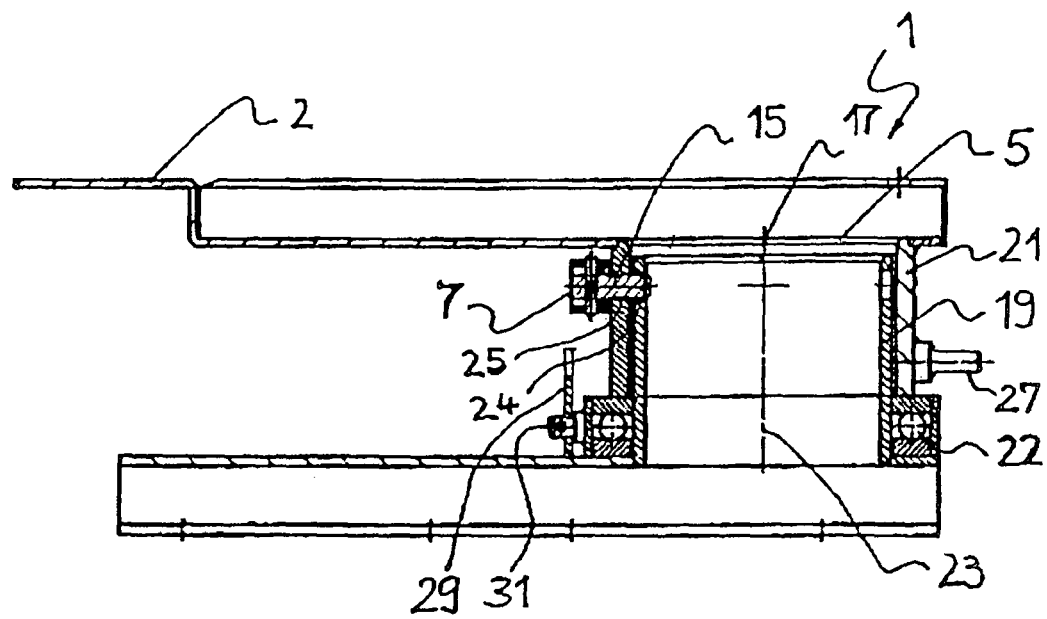
FIG. 2 is a section in the plane A-A of the support according to FIG. 1.

FIG. 2 shows a section through the support according to the invention along a plane A-A (see FIG. 1). The opening 5 in the base plate 2 is formed by two sleeves 19 and 21 in the form of hollow cylinders disposed one coaxially in the other. The outer sleeve 21 is connected to the base plate 2 and supported by means of a ball bearing 22 rotatably about an axis 23 on the inner sleeve 19. Inside the sleeves 19 and 21 cables for the power supply, signal transmission and hydraulic system of the seating and operating unit are disposed once this unit has been fastened on the base plate 2. The axis 23 extends through the center 17 of the opening 5.

The sleeves 19, 21 have openings 24 and 25, which in the illustrated position mutually overlap and into which the pin 15 engages. The outer sleeve 21 with the base plate 2 may be rotated only if the lever 7 has been swivelled in such a way that the pin 15 no longer engages into the opening 24 of the inner sleeve 19. The outer sleeve 21 has on its lateral surface an outwardly projecting pin 27, which is used to limit the angle of rotation of the sleeve 21.

Figure 3:
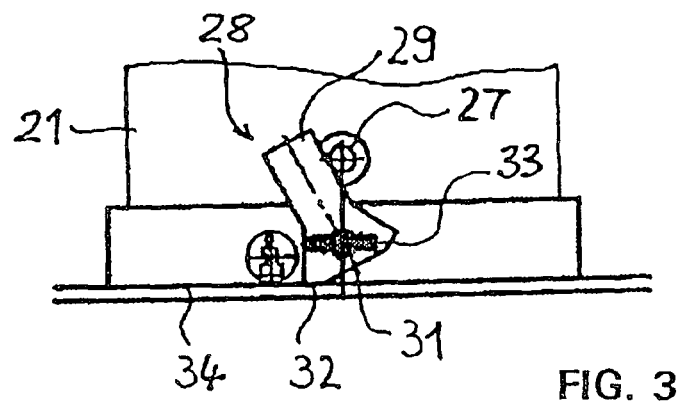
FIG. 3 is a view of a limiting device of a support according to the invention.

A limiting device 28 for limiting the rotatability of the sleeve 21 with the base plate 2 is shown in FIG. 3. It comprises a stop 29, which is pivotable about an axis 31. In the course of rotation of the outer sleeve 21 about the inner sleeve 19, the pin 27 rigidly connected to the outer sleeve 21 after a specific angle reaches the stop 29. Through rotation of the outer sleeve 21, the pin 27 travels along an arc towards the stop 29 and presses and pivots said stop about the axis 31 in the direction of the circular movement. After a preset swivelling angle of the stop 29, however, a foot surface 32 of the stop 29 rests on a flat bottom surface 34 of the support or of a cab floor and therefore holds the stop 29 fast in the attained position. Further movement of the pin 27 in the same direction is therefore prevented. Consequently, the rotational movement of the base plate 2 including the seating and operating unit is also limited. When the pin 27 is situated at the stop 29, the openings 24 and 25 of the inner sleeve 19 and the outer sleeve 21 are disposed one over the other, so that the pin 15 of the lever 7 engages under the action of the spring 8 into the openings 24, 25 and fixes the base plate 2 in this angular position. When the outer sleeve 21 is rotated from this angular position through 360° in the other direction, the stop 29 is swivelled by the pin 27 in the other direction and its rotation is limited in the same manner with the aid of the other foot surface 33. Thus, the seating and operating unit fastened on the base plate 2 of the support 1 may be rotated through a total of 360°. A rotation beyond 360° is not possible. This prevents twisting of the cables and lines disposed in the sleeve 19. If, instead of one pin 27, e.g. two such pins are disposed at the periphery of the sleeve 21, it is then possible to preset e.g. a limit angle of 180° if the pins are disposed exactly opposite one another. Any other limit angles smaller than 360° are equally possible by means of two pins.

Limiting the rotatability of the seating and operating unit to an angle of rotation of 360° has the advantage that the seating and operating unit may be rotated into two exactly opposite normal positions, namely a first normal position, e.g. for forward travel, at 180° and a second normal position, e.g. for reverse travel, at 0° and/or 360°. From the first normal position, the second normal position may be reached in both possible directions of rotation. Furthermore, intermediate positions lying between the two normal positions may be reached directly from the first normal position in both directions of rotation. In any case, it is however ensured that the total rotation does not exceed an angle of rotation of 360°, so that the mobility or elastic deformability of cables and lines may be tuned thereto and overstressing is avoided.

In a further embodiment, in the inner sleeve 19 and the outer sleeve 21 slots may be provided, into which an extension of the lever 7 engages. The extension is then fastened e.g. by clamping in the slots. In this way, a greater number of lockable angle-of-rotation positions of the base plate 2 and seating and operating unit are provided within the limited angle-of-rotation range.

The switch 9 detects whether or not the lever 7 is in the locking position. It is connected to a circuit, which it closes in the locking position of the lever 7 and which it interrupts as soon as the lever 7 is moved out of the locking position. The interruption of the circuit is evaluated by a monitoring device, which then, for example, prevents starting of the vehicle or sends out a warning signal.

In addition to the described switching function, the switch 9 may be equipped with further, also active functions. For example, the switch 9 may be provided with an electromagnetic blocking device so that the lever 7 is pivotable into an unlocking position only if a condition ruling out driving of the commercial vehicle is met. This might be, for example, actuation of the parking brake. A further such condition might be non-actuation of the accelerator or non-actuation of the ignition key.

Given such a condition, the lever 7 cannot be actuated also during operation of the commercial vehicle. However, should the lever 7 during starting of the commercial vehicle not be situated in a locking position, i.e. should the pin 15 not engage into an opening of the sleeve 19, then the switch 9 cannot move into the blocking position, in which a release of the lever 7 is prevented. In such a case, the starting operation of the commercial vehicle would be prevented by the monitoring device and optionally warning signals would additionally be produced.

In a modification of the described embodiment, the limiting device 28 may have a variable pivotable stop, which may be disposed at various positions on the sleeve 21, so that the possible angle of rotation of the seating and operating unit fastened on the support is adaptable to various types of commercial vehicle or to the needs of the driver.

Figure 4:
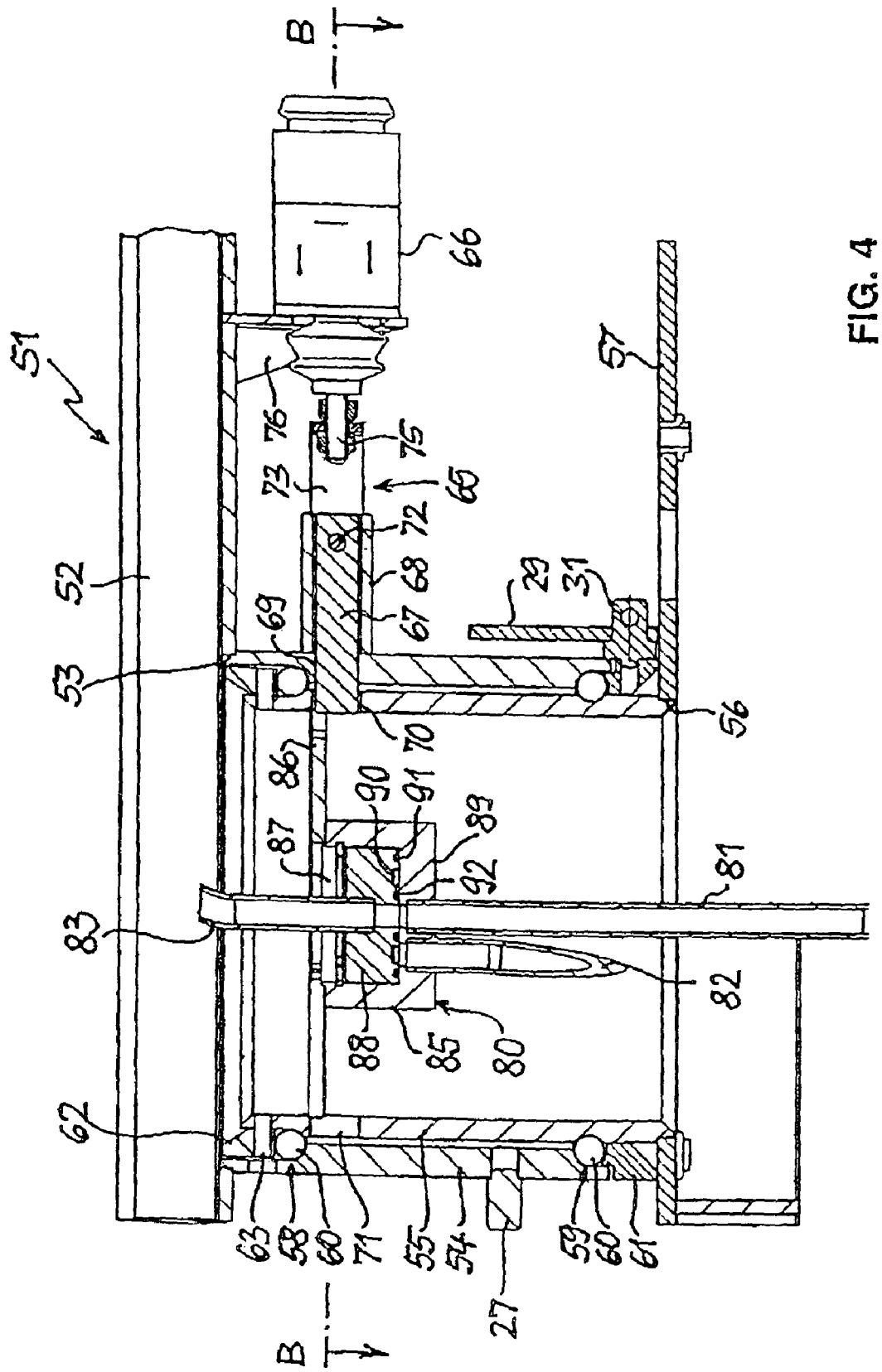
FIG. 4 is a cross section through a further embodiment of a support according to the invention.
Figure 5:
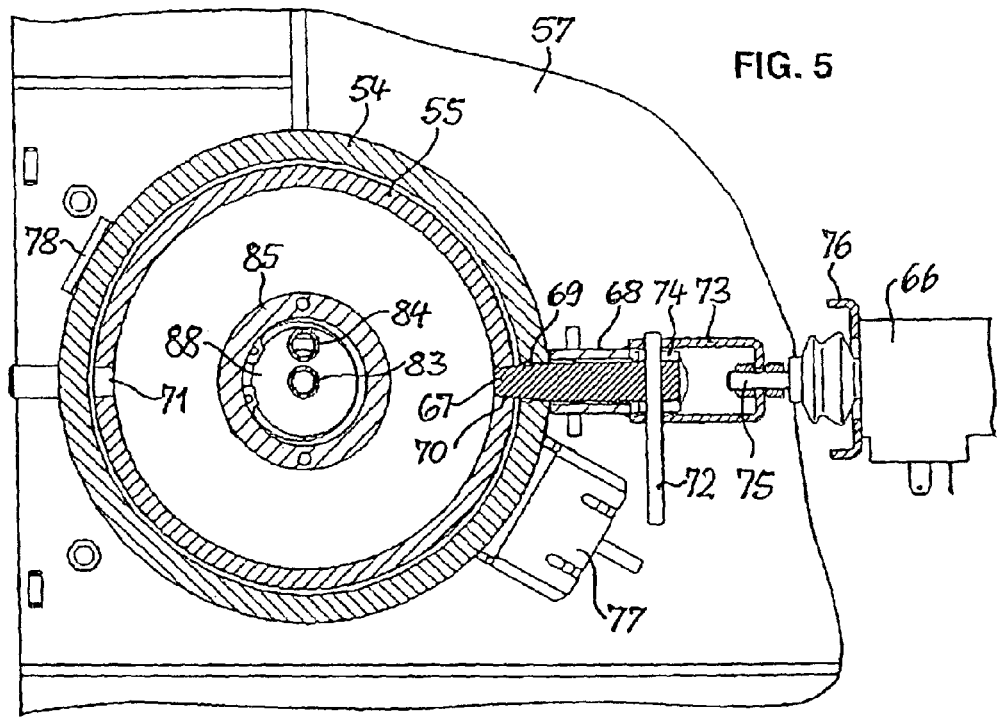
FIG. 5 is a section in the plane B-B of the support according to FIG. 4.
Figure 6:
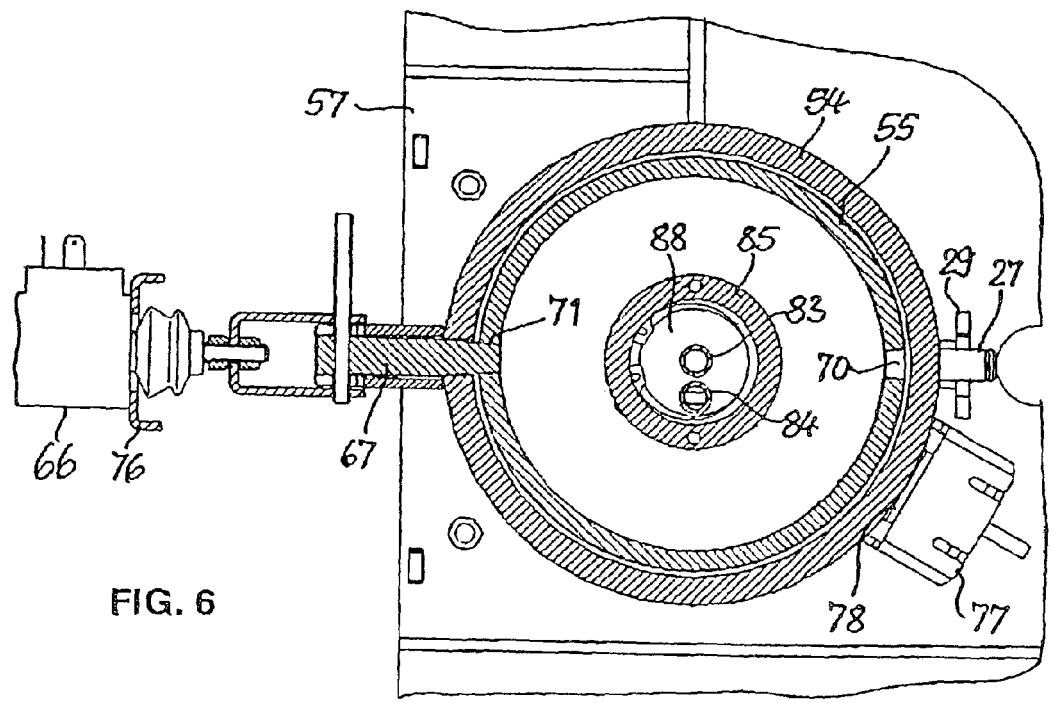
FIG. 6 is a section in the plane B-B of the support according to Figure, with the outer sleeve rotated through 180°.

In FIGS. 4 to 6 a further embodiment of a support 51 is illustrated. For fastening a seating and operating unit the support 51 comprises a base plate 52, which has an opening 53 and is rigidly connected to a cylindrical sleeve 54, which engages into the opening 53. Situated in the bore of the sleeve 54 is a second sleeve 55, which is fastened in an opening 56 of a supporting plate 57. The supporting plate 57 is used to fasten the support in a commercial vehicle, e.g. to the floor of the driver's cab.

The sleeve 54 is supported rotatably by means of two ball bearings 58, 59. The ball bearings 58, 59 are spaced axially apart from one another and situated in the vicinity of the ends of the sleeves 54, 55. For forming the ball bearings, the sleeves 54, 55 each have mutually opposite recesses, in which balls 60 are disposed. For assembly reasons, the bearing recess in the sleeve 54 at the bottom ball bearing 59 is open in a downward direction and into the opening a bearing ring 61 engages, which is fastened to the sleeve 55 and supported on the supporting plate 57. At the top ball bearing 58 the bearing recesses in both sleeves 54, 55 are open in axial direction towards the sleeve ends, so that the balls 60 are easy to install from above. Situated above the balls 60 is a bearing ring 62, which is fastened by means of spring-type straight pins 63 to the sleeve 55 and closes the bearing chamber except for an annular gap. The ball bearings 58, 59 owing to this configuration may transmit forces in both axial directions and in the radial direction.

Limiting the angle of rotation of the sleeve 54 in the support 51 is effected in the same way as in the previously described support 1. The corresponding components of the limiting device may be seen in FIG. 4, where they are provided with the same reference numerals. In the position of the sleeve 54 shown in FIG. 4, the pin 27 is situated at the opposite side of the pivotable stop 29, i.e. in the 180° angle-of-rotation position. By rotating the sleeve 54 through 180° in a counterclockwise or clockwise direction, the pin 27 comes into engagement with the pivotable stop 29, thereby preventing further rotation.

For locking the sleeve 54 and hence immobilizing the base plate 52 with the seating and operating unit fastened thereon in the respective position, a locking unit 65 is provided, which comprises a radially movable pin 67 that is actuable with the aid of an electromagnet 66. The electromagnet 66 is fastened to a rest 76 disposed at the underside of the base plate 52. The pin 67 is situated in a radially extending guide sleeve 68, which is provided at the outer side of the sleeve 54 and the bore of which is adjoined by a bore 69 that penetrates the wall of the sleeve 54. The bore 69 is aligned, in the 180° position of the sleeve 54 shown in FIGS. 4 and 5, with a bore 70 in the sleeve 55 and, in the 0°/360° position of the sleeve 54 shown in FIG. 6, with a bore 71 in the sleeve 55. To lock the sleeve 54 in one of these positions, the pin 67 is moved radially inwards through the bore 69 until it engages with its radially inner end fully into the bore 70 or the bore 71.

A fork 73 is fastened to the radially outer end of the pin 67 with the aid of a transverse pin 72. The radially outer end of the guide sleeve 68 is provided at opposite sides with slots 74, and the transverse pin 72 disposed in a transverse bore of the pin 67 extends through the slots 74 into bores in the fork 73, which embraces the guide sleeve 68. The fork 73 is connected in an axially adjustable manner to an armature bar 75 of the electromagnet 66. The armature of the electromagnet 66 is moved by spring action into the position shown in FIGS. 4 and 5, in which the armature bar 75 is extended and in which the fork 73 holds the pin 67 in the locking position. When the electromagnet 66 is connected to a voltage source, its armature, while simultaneously overcoming the spring action, pulls the armature bar 75 back into the housing of the electromagnet 66 so that the radially inner end of the pin 67 is pulled out of the bore 70 and/or 71 and retracted far enough into the bore 69 to allow the sleeve 54 to rotate freely relative to the sleeve 55. Unlocking of the sleeve 54 is therefore possible only when the electromagnet 66 is triggered. An unintentional release of the locking unit may therefore easily be prevented by interrupting the power supply to the electromagnet 66 before or during starting of the vehicle drive.

In order, in the event of a fault or in the event of failure of the electromagnet 66, still to be able to release the locking unit 65, one end of the transverse pin 72 projects at the outer side of the fork 73 far enough from the fork 73 to be gripped by hand. This allows the transverse pin 72 to be moved by hand in the direction of the electromagnet 66 and hence bring the pin 67 into the release position.

The monitoring device is further equipped to establish, in which of the two normal positions the seating and operating unit is situated when the locking unit 65 is locked. For this purpose, the electromagnet 66 is provided with a signal transmitter that detects the locking position of the magnet armature. Alternatively, a solenoid switch may be provided, which may be actuated by the transverse pin 72 or by another part connected to the pin 67. On the supporting plate 57 a second signal transmitter in the form of an solenoid switch 77 is moreover disposed, which is actuable by means of a magnet 78 attached to the outer side of the sleeve 54.

In the locking position shown in FIG. 5, which corresponds e.g. to the normal position for forward travel at an angle of rotation of 180°, the magnet 78 is situated at the opposite side of the sleeve 54 to the solenoid switch 77. The solenoid switch 77 is therefore in the open position. The signal transmitter in the electromagnet 66 moreover indicates that the sleeve 54 is locked. From these two items of information the monitoring device recognizes that the seating and operating unit is correctly locked in the normal position for forward travel. This results in enabling of the operating elements for forward travel and disabling of the operating elements for reverse travel.

In FIG. 6 the sleeve 54 is situated in a correctly locked manner in the 0° and/or 360° position provided e.g. for reverse travel. In this position the solenoid switch 77 and the magnet 78 are immediately adjacent, with the result that the solenoid switch 77 is closed. The signal transmitter of the electromagnet 66 again indicates the locking position. From these items of information of the signal transmitter and the solenoid switch 77 the monitoring device recognizes that the seating and operating unit is situated in conformity with specification in the position for reverse travel, this resulting in enabling of the operating elements for reverse travel and disabling of the operating elements for forward travel.

If the sleeve 54 is in an angular position differing from the two described normal positions, then the locking unit is unlocked and is also unable to move into the locking position. This is likewise recognized by the monitoring device with the aid of the signal transmitter in the electromagnet 66 and leads to disabling of the operating elements for both directions of travel. The driver therefore first has to bring the seat into the correct position, in which the pin 67 may latch into one of the bores 70 or 71, before enabling of the operating elements for the direction of travel corresponding to the seat position may be achieved.

The support 51 further comprises a rotating bushing 80, which is suitable for connecting two parallel pipelines 81, 82 of the commercial vehicle to two parallel pipelines 83, 84, which are disposed on the seating and operating unit fastened to the base plate 52. The rotating bushing 80 has a cylindrical housing 85, which is fastened to a web 86, which extends across the bore of the sleeve 55 and is rigidly connected to the sleeve 55. The housing 85 is disposed coaxially with the sleeve 55 and has a coaxial cylinder bore 87, which is open in the direction of the base plate 52 and in which a cylindrical connecting body 88 is rotatably disposed. The connecting body 88 is held in the cylinder bore 87 with the aid of a retaining ring. The housing 85 has a flat base 89, in which two parallel through-bores are situated, one of which is disposed centrally. In the through-bores the ends of the pipelines 81, 82 are fastened in a pressure-tight manner. The connecting body 88 has a central through-bore, in which the end of the pipeline 83 is fastened in a pressure-tight manner. The pipelines 81 and 83 are therefore directly connected to one another by the central through-bores.

In the bottom surface of the connecting body 88 facing the base 89 a concentric annular groove 90 is formed. Situated radially inside and radially outside of the annular groove 90 and concentrically therewith are sealing annular grooves each containing a sealing ring 91 and/or 92. The sealing rings 91, 92 seal off the annular groove 90 relative to the base 89 of the housing 85. The diameter of the annular groove 90 is of such a large dimension that the through-bore in the base 89 that is connected to the pipeline 82 is in communication with the annular groove 90. Opening into the annular groove 90, moreover, is a connecting bore, which is provided paraxially in the connecting body 88 and to which, as FIGS. 5 and 6 reveal, the pipeline 84 is connected. The pipelines 82, 84 are therefore connected to one another by the annular groove 90. When the base plate 52 is rotated relative to the supporting plate 57, the pipelines 83, 84 and the connecting body 88 also rotate with it. This does not however have any influence on the connection of the pipelines 83, 84 to the pipelines 81, 82.

The described rotating bushing 80 makes it possible for a seating and operating unit, which is disposed on the support 51, to be connected to pneumatic or hydraulic components of the vehicle by rigid pipes. In addition, cables and hosepipes may be run through the support 51 to the seating and operating unit.

What is claimed is:

1. A support for a commercial vehicle seating and operating unit, which is fastened to the support, the support comprising a rotatable bearing arrangement, by means of which the seating and operating unit is supported rotatably about a vertical axis of rotation, wherein the bearing arrangement comprises a base plate for fastening said seating and operating unit and having a first opening, a supporting plate for rigidly fastening the support in a commercial vehicle and having a second opening, and two cylindrical sleeves disposed one coaxially in the other, a first sleeve that is rigidly connected to the supporting plate and a second sleeve that is rigidly connected to the base plate, the second sleeve being rotatable in relation to the first sleeve, the inner sleeve forming a passage for the penetration of cables, pipes or hosepipes that connect the seating and operating unit to a unit of the vehicle, said passage communicating with the first and second openings, and the bearing arrangement comprising a limiting device that limits the rotation of the seating and operating unit about the vertical axis of rotation to a preset maximum angle, and a separate, releasable locking unit, wherein the limiting device limits the angle of rotation of the seating and operating unit to substantially 360° so that rotation of the seating and operating unit beyond 360° is not possible at all, and wherein in the 0° and substantially 360° limit position a first normal operating position of the seating and operating unit is situated, in which the bearing arrangement is lockable by means of the releasable locking unit.

2. The support as claimed in claim 1, wherein in the 180° position a second normal operating position of the seating and operating unit is situated, in which the bearing arrangement is lockable by means of a locking unit.

3. The support as claimed in claim 1, wherein the seating and operating unit is lockable in a large number of angular positions within the limited range by means of the locking unit.

4. The support as claimed in claim 1, wherein the first sleeve is disposed in the second sleeve.

5. The support as claimed in claim 1, wherein the inner sleeve at its outer periphery has annular recesses, opposite which lie annular recesses in the bore of the outer sleeve and in the annular recesses balls are disposed to form a ball bearing.

6. The support as claimed in claim 1, wherein the axis of rotation is spaced apart from the center of the seating and operating unit.

7. A support for a commercial vehicle seating and operating unit, which is fastened to the support, the support comprising a rotatable bearing arrangement, by means of which the scaling and operating unit is supported rotatably about a vertical axis of rotation, wherein the bearing arrangement comprises a limiting device, which limits the rotation of the seating and operating unit about the vertical axis to a preset maximum angle, and wherein the support comprises a locking unit, which is automatically lockable by a spring action and is releasable counter to the spring action by means of a servo mechanism, and by means of which locking unit the bearing arrangement is lockable in a position, wherein the servo mechanism is triggerable only when at least one condition ruling out movement of the commercial vehicle is met.

8. The support as claimed in claim 7, wherein a condition ruling out movement of the commercial vehicle is actuation of the parking brake.

9. The support as claimed in claim 7, wherein a condition ruling out movement of the commercial vehicle is putting the vehicle drive out of operation.

10. A support for a commercial vehicle seating and operating unit, which is fastened to the support, the support comprising a rotatable bearing arrangement, by means of which the seating and operating unit is supported rotatably about a vertical axis of rotation, wherein the bearing arrangement comprises a limiting device, which limits the rotation of the seating and operating unit about the vertical axis to a preset maximum angle, and wherein the support comprises a locking unit, which is automatically lockable by a spring action and is releasable counter to the spring action by means of a servo mechanism and by means of which the bearing arrangement is lockable in a position, wherein a monitoring unit is provided, which detects the locking of the seating and operating unit in at least one normal position, suitable for driving or other operating functions.

11. The support as claimed in claim 10, wherein on an attempt to release the locking unit while the drive of the commercial vehicle is in operation, the monitoring unit triggers an audible and/or visible and/or tangible warning signal.

12. The support as claimed in claim 10, wherein the monitoring unit prevents switching-on of the vehicle drive of the commercial vehicle when the locking unit is released.

13. The support as claimed in claim 10, wherein in the event of starting of the drive of the commercial vehicle in the released state of the locking unit the monitoring unit triggers an audible and/or visible and/or tangible warning signal.

14. The support as claimed in claim 10, wherein a signal transmitter connected to the monitoring device is provided, which may be activated as a function of the angle of rotation position of the bearing arrangement.

\* \* \* \* \*